US012327398B2

(12) United States Patent
Rabinovici-Cohen et al.

(10) Patent No.: US 12,327,398 B2
(45) Date of Patent: Jun. 10, 2025

(54) GENERATING BALANCED TRAIN-TEST SPLITS FOR MACHINE LEARNING

(71) Applicant: INTERNATIONAL BUSINESS MACHINES CORPORATION, Armonk, NY (US)

(72) Inventors: Simona Rabinovici-Cohen, Haifa (IL); Ella Barkan, Haifa (IL); Tal Tlusty Shapiro, Zichron Yaacov (IL)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 18/061,024

(22) Filed: Dec. 2, 2022

(65) Prior Publication Data

US 2024/0185575 A1 Jun. 6, 2024

(51) Int. Cl.
*G06V 10/00* (2022.01)
*G06N 3/0464* (2023.01)
(Continued)

(52) U.S. Cl.
CPC ......... *G06V 10/774* (2022.01); *G06N 3/0464* (2023.01); *G06V 10/40* (2022.01);
(Continued)

(58) Field of Classification Search
CPC ............ G06N 3/02; G06N 3/08; G06N 3/042; G06N 3/045; G06N 3/047; G06N 3/082; G06N 3/092; G06N 3/0454; G06N 3/0475; G06N 3/0464; G06V 10/82; G06V 10/761; G06V 10/762; G06V 10/774; G06V 10/771; G06V 10/776; G06V 10/40
See application file for complete search history.

(56) References Cited

U.S. PATENT DOCUMENTS 8,762,303 B2    6/2014  Zhao
11,200,669 B2 * 12/2021 Feng .................... G06T 5/60
(Continued)

OTHER PUBLICATIONS

Birba, "A Comparative study of data splitting algorithms for machine learning model selection", KTH School of electrical Engineering and Computer Science (EECS), 2020, 29 Pages. http://kth.diva-portal.org/smash/record.jsf?pid=diva2%3A1506870&dswid=-910.
(Continued)

*Primary Examiner* — Amir Alavi
(74) *Attorney, Agent, or Firm* — Teddi E. Maranzano (57) ABSTRACT

An embodiment for generating balanced train-test splits for machine learning analysis. The embodiment may automatically extract low-level features and high-level features from a series of received datasets. The embodiment may automatically determine a series of impactful features for each of the received datasets correlating to a corresponding label. The embodiment may automatically select subsets of impactful features The embodiment may automatically cluster the received datasets to generate series of clusters, each of the generated series of clusters corresponding to one of the selected subsets of impactful features. The embodiment may automatically generate train-test split versions using datasets from each cluster in each of the generated series of clusters. The embodiment may automatically score each of the generated train-test split versions and select a highest-scoring train-test split version.

20 Claims, 2 Drawing Sheets

(51) Int. Cl.
  *G06V 10/40* (2022.01)
  *G06V 10/762* (2022.01)
  *G06V 10/771* (2022.01)
  *G06V 10/774* (2022.01)
  *G06V 10/776* (2022.01)
  *G06V 10/82* (2022.01)

(52) U.S. Cl.
  CPC .......... *G06V 10/762* (2022.01); *G06V 10/771* (2022.01); *G06V 10/776* (2022.01); *G06V 10/82* (2022.01); *G06V 2201/03* (2022.01)

(56) References Cited

U.S. PATENT DOCUMENTS

| | | | | |
|---|---|---|---|---|
| 11,232,558 | B2* | 1/2022 | Liu | G06T 7/10 |
| 11,270,446 | B2* | 3/2022 | Liao | G06T 7/30 |
| 11,495,210 | B2* | 11/2022 | Li | G10L 15/18 |
| 11,501,104 | B2* | 11/2022 | Ung | G06T 7/20 |
| 11,537,884 | B2* | 12/2022 | Liu | G06F 18/2415 |
| 11,604,984 | B2* | 3/2023 | Sharma | G06N 20/20 |
| 11,620,831 | B2* | 4/2023 | Walls | G06V 10/771 |
| | | | | 382/104 |
| 11,688,071 | B2* | 6/2023 | Hu | G06T 11/005 |
| | | | | 382/128 |
| 12,142,083 | B2* | 11/2024 | Chen | G06F 18/21 |
| 2021/0295501 | A1* | 9/2021 | Hu | G06T 7/11 |

OTHER PUBLICATIONS

Choudhury, et al., "Training Machine Learning Models on Multimodal Health Data with Amazon SageMaker", AWS for Industries, Jun. 1, 2022, 9 Pages. https://aws.amazon.com/blogs/industries/training-machine-learning-models-on-multimodal-health-data-with-amazon-sagemaker/.

Dobbin, et al., "Optimally splitting cases for training and testing high dimensional classifiers", BMC Medical Genomics, 2011, 8 Pages. https://bmcmedgenomics.biomedcentral.com/track/pdf/10.1186/1755-8794-4-31.pdf.

Farias, et al., "Similarity Based Stratified Splitting: an approach to train better classifiers", arXiv:2010.06099v1 [cs.LG] Oct. 13, 2020, 15 Pages. https://arxiv.org/pdf/2010.06099.pdf.

Heusel, et al., "GANs Trained by a Two Time-Scale Update Rule Converge to a Local Nash Equilibrium", ARXIV, Jan. 12, 2018, 38 Pages. https://arxiv.org/abs/1706.08500v6.

Joseph, et al., "SPlit: An Optimal Method for Data Splitting", Taylor & Francis, Technometrics, Jun. 1, 2021, pp. 166-176. https://www.tandfonline.com/doi/full/10.1080/00401706.2021.1921037.

Khalid, et al., "Algorithmic Splitting: A Method For Dataset Preparation", IEEE Access, vol. 4, 2016, pp. 1-12. https://www.researchgate.net/publication/354399398.

Milbich, et al., "Characterizing Generalization under Out-Of-Distribution Shifts in Deep Metric Learning", arXiv:2107.09562v1 [cs.LG] Jul. 20, 2021, 24 Pages. https://deepai.org/publication/characterizing-generalization-under-but-of-distribution-shifts-in-deep-metric-learning.

Pasini, et al., "Scalable balanced training of conditional generative adversarial neural networks on image data", Lupo Pasini, U.S. Department of Energy, Apr. 26, 2021, 25 pages. https://www.osti.gov/pages/biblio/1783019.

Willette, et al., "Improving Uncertainty Calibration via Prior Augmented Data", arXiv:2102.10803v1 [cs.LG] Feb. 22, 2021, 14 Pages. https://arxiv.org/abs/2102.10803v1.

Xu, et al., "On Splitting Training and Validation Set: A Comparative Study of Cross-Validation, Bootstrap and Systematic Sampling for Estimating the Generalization Performance of Supervised Learning", Journal of Analysis and Testing, Oct. 29, 2018, https://doi.org/10.1007/s41664-018-0068-2, 14 Pages.

Zhou, et al., "Multi-Objective-Based Radiomic Feature Selection for Lesion Malignancy Classification", IEEE J Biomed Health Inform, PMC Jan. 1, 2020, pp. 1-34. https://pubmed.ncbi.nlm.nih.gov/30835231/.

* cited by examiner

GENERATING BALANCED TRAIN-TEST SPLITS FOR MACHINE LEARNING

BACKGROUND

The present application relates generally to machine learning models, and more particularly, to generating balanced train-test splits for machine learning analysis.

Machine learning models use algorithms to learn from data contained in datasets by continuously finding patterns and developing understanding as the machine learning models make and evaluate decisions. Train-test split evaluations may be used to evaluate the performance of a given machine learning model. For these evaluations the datasets used are split into two subsets. The first subset of datasets includes train datasets. Train datasets are fed into a given machine learning model to train or 'fit' the model as it discovers and learns new patterns. The second subset of datasets includes test datasets. Once a machine learning model is fit using train datasets, unseen data (data not used to train the model) is needed to test the machine learning model. Test datasets allow for evaluation of a given machine learning model's performance. A user may then subsequently use the information from this evaluation to adjust or optimize the training of the machine learning model to improve its performance.

SUMMARY

According to one embodiment, a method, computer system, and computer program product for generating balanced train-test splits for machine learning analysis is provided. The embodiment may include automatically extracting low-level features and high-level features from a series of received datasets. The embodiment may further include automatically determining a series of impactful features for each of the received datasets correlating to a corresponding label. The embodiment may also include automatically selecting subsets of impactful features. The embodiment may further include automatically clustering the received datasets to generate series of clusters, each of the generated series of clusters corresponding to one of the selected subsets of impactful features. The embodiment may also include automatically generating train-test split versions using datasets from each cluster in each of the generated series of clusters. The embodiment may also include automatically scoring each of the generated train-test split versions. The embodiment may further include automatically selecting a highest-scoring train-test split version.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to machine learning models, and more particularly, to generating balanced train-test splits for machine learning analysis. The following described exemplary embodiments provide a system, method, and program product to, among other things, automatically extract low-level features and high-level features from a series of received datasets, automatically determine a series of impactful features for each of the received datasets correlating to a corresponding label, automatically select subsets of impactful features, and automatically cluster the received datasets to generate series of clusters, each of the generated series of clusters corresponding to one of the selected subsets of impactful features. The described exemplary embodiments may then generate train-test split versions using datasets from each cluster in each of the generated series of clusters, automatically score each of the generated train-test split versions, and automatically select a highest-scoring train-test split version. Therefore, the presently described embodiments have the capacity to improve generating balanced train-test splits for machine learning analysis by ensuring that impactful features considered by a given machine learning model in making predictions are considered when generating train-test splits.

As previously described, machine learning models use algorithms to learn from data contained in datasets by continuously finding patterns and developing understanding as the machine learning models make and evaluate decisions. Train-test split evaluations may be used to evaluate the performance of a given machine learning model. For these evaluations the datasets used are split into two subsets. The first subset of datasets includes train datasets. Train datasets are fed into a given machine learning model to train or 'fit' the model as it discovers and learns new patterns. The second subset of datasets includes test datasets. Once a machine learning model is fit using train datasets, unseen data (data not used to train the model) is needed to test the machine learning model. Test datasets allow for evaluation of a given machine learning model's performance. A user may then subsequently use the information from this evaluation to adjust or optimize the training of the machine learning model to improve its performance. Train-test split evaluations are particularly useful in environments in which there are enough datasets and records to cover all common cases and most uncommon cases that may be encountered in a given domain. In other words, train-test split evaluations become more useful as the number of relevant datasets and records for a given domain increases.

There are several challenges related to the use train-test split evaluations. In environments in which the number of available datasets or records is insufficient to cover all common cases or multiple uncommon cases, traditional train-test splits may be ineffective. This is because in this environment (having insufficient available datasets or records to cover certain common cases or multiple uncommon case) splitting of the datasets into train and test sets will generally result in an insufficient amount of data in the training dataset for the target machine learning model to learn an effective mapping of inputs to outputs. There will also typically be an insufficient amount of data in the test set to effectively evaluate the performance of the target machine learning model. For example, the estimated performance in this exemplary environment may be overly optimistic or overly pessimistic.

Another challenge related to the use of train-test split evaluations in environments having insufficient amounts of available datasets (as discussed above) is that generating train-test splits that are split by label or ground truth will not generate a train-test split that is also balanced with regards to important features considered by the machine learning model (as it would accomplish in an environment having a sufficiently large amount of available datasets to cover all common and most uncommon cases). This challenge is even greater within a domain having increasing numbers of features considered and datatypes. For example, multimodal medical data (such as clinical data and medical imaging) typically involves datasets involving many modes or types of medical imaging procedures. Domains involving multimodal medical imaging data have relatively high dimensionality and a significant amount of natural noise in the images. Furthermore, there may be multiple acquisition processes to be considered. Thus, in multimodal medical domains having an insufficient number of available datasets to cover all common cases and some uncommon cases, the traditional generation of train-test splits is often considered inappropriate, as the generated split is typically ineffective and is likely not balanced in view of the features considered by the target machine learning model.

Accordingly, a method, computer system, and computer program product for generating balanced train-test splits for machine learning analysis would benefit many businesses who utilize machine learning models across various domains, some of which may be multimodal domains having a limited number of available datasets. The method, system, and computer program product may automatically extract low-level features and high-level features from a series of received datasets. The method, system, computer program product may automatically determine a series of impactful features for each of the received datasets correlating to a corresponding label. The method, system, computer program product may then automatically select subsets of impactful features. The method, system, computer program product may then automatically cluster the received datasets to generate series of clusters, each of the generated series of clusters corresponding to one of the selected subsets of impactful features. Then, the method, system, computer program product may automatically generate train-test split versions using datasets from each cluster in each of the generated series of clusters. Next, the method, system, computer program product may automatically score each of the generated train-test split versions. Thereafter, the method, system, computer program product may automatically select a highest-scoring train-test split version. In turn, the method, system, computer program product has provided improved methods for generating balanced train-test splits for machine learning analysis. Described embodiments provide a method of generating train-test splits that are balanced in view of both the extracted labels and the features considered most by a given machine learning model, thereby improving the effectiveness of train-test split evaluations even in environments in which there is multimodal data having high dimensionality, or even environments having an insufficient amount of available datasets to cover all common cases and most uncommon cases for a given domain.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
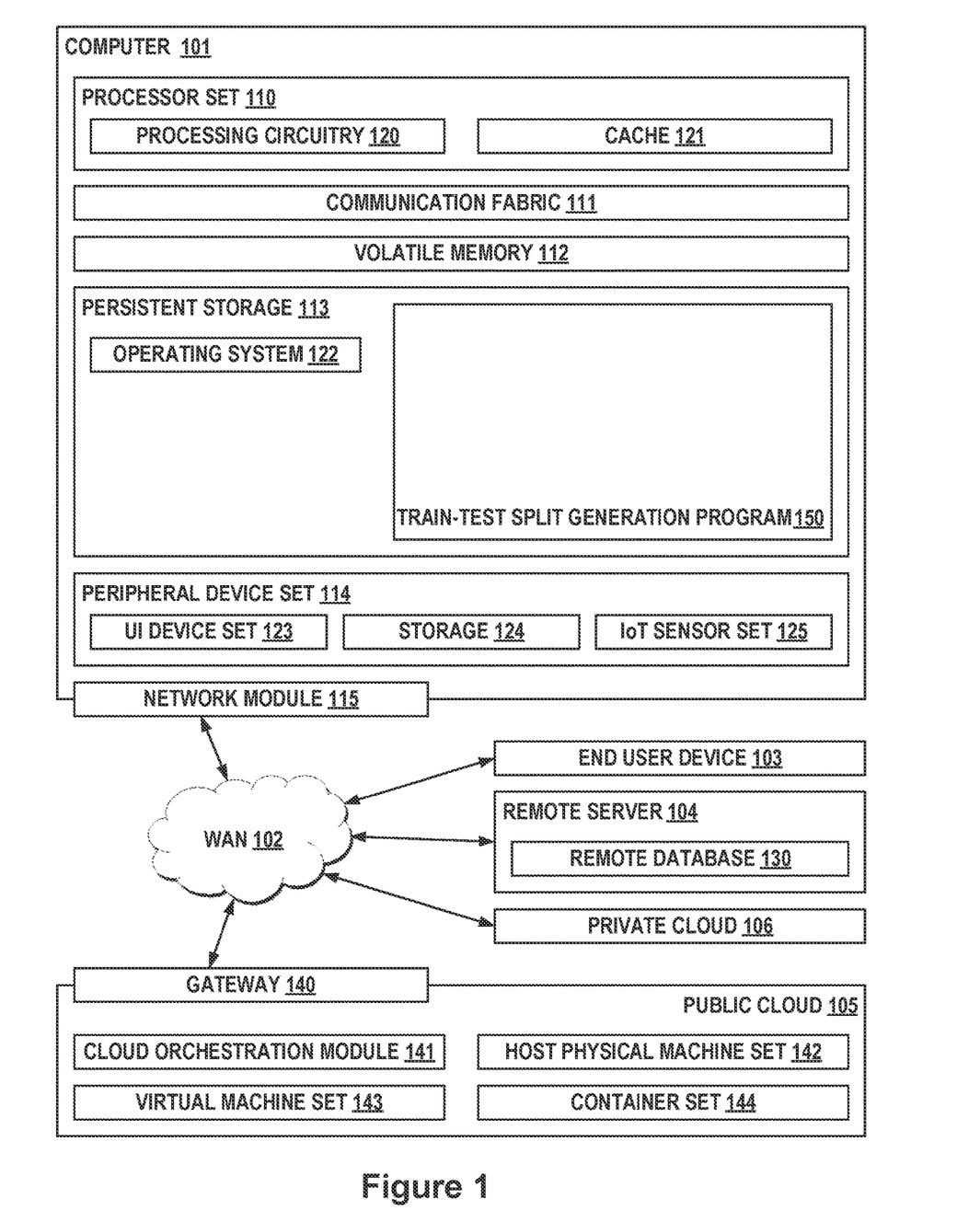
FIG. 1 illustrates an exemplary networked computer environment according to at least one embodiment.

Referring now to FIG. 1, computing environment 100 contains an example of an environment for the execution of at least some of the computer code involved in performing the inventive methods, such as train-test split generation program/code 150. In addition to train-test split generation code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and train-test split generation code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in train-test split generation code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in train-test split generation code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the train-test split generation program 150 may be a program capable of automatically extracting low-level features and high-level features from a series of received datasets. Train-test split generation program 150 may then automatically determine a series of impactful features for each of the received datasets correlating to a corresponding label. Next, train-test split generation program 150 may automatically select subsets of impactful features. Train-test split generation program 150 may then automatically cluster the received datasets to generate series of clusters, each of the generated series of clusters corresponding to one of the selected subsets of impactful features. Next, train-test split generation program 150 may automatically generate train-test split versions using datasets from each cluster in each of the generated series of clusters. Then, train-test split generation program 150 may automatically score each of the generated train-test split versions Thereafter, train-test split generation program 150 may automatically select a highest-scoring train-test split version. In turn, train-test split generation program 150 has provided improved methods for generating balanced train-test splits for machine learning analysis. Described embodiments provide a method of generating train-test splits that are balanced in view of both the extracted labels and the features considered most by a given machine learning model, thereby improving the effectiveness of train-test split evaluations even in environments in which there is multimodal data having high dimensionality, or even environments having an insufficient amount of available datasets to cover all common cases and most uncommon cases for a given domain.

Figure 2:
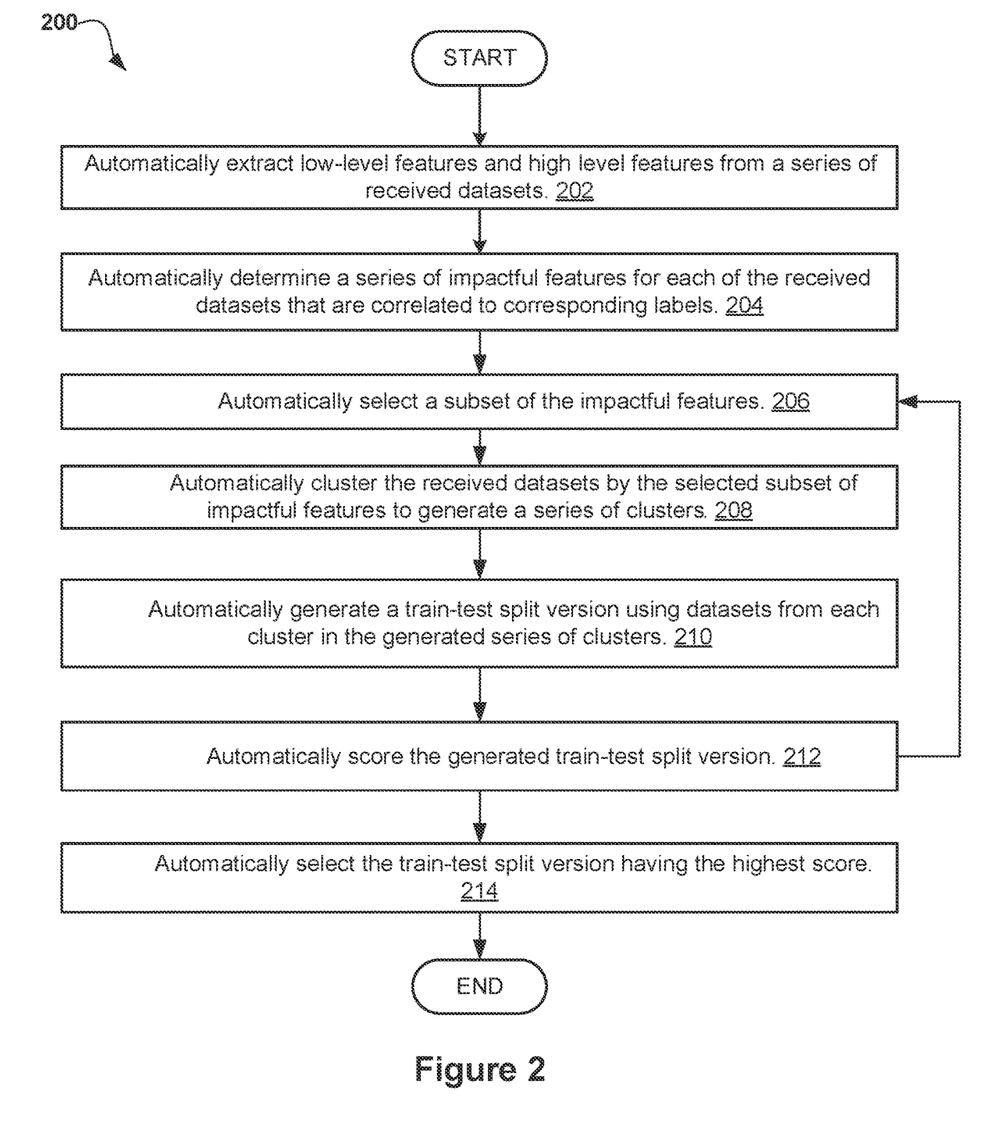
FIG. 2 illustrates an operational flowchart for a process of generating balanced train-test splits for machine learning analysis.

Referring now to FIG. 2, an operational flowchart for a process 200 of generating balanced train-test splits for machine learning analysis according to at least one embodiment is provided. An exemplary embodiment including a train-test split generation program 150 employed within an exemplary domain including multimodal clinical and medical imaging data will be discussed throughout the description of process 200.

At 202, train-test split generation program 150 may automatically extract low-level features and high-level features from a series of received datasets. In the context of this disclosure low-level features refers to any factors or data that may be used by a given machine learning model to make a prediction, decision, or classification. For example, in a domain related to multi-modal medical imaging, low-level features may include, for example, radiomics features from imaging data, such as Gabor features, Local Binary Pattern (LBP) features, Gray Level Co-occurrence Matrix (GLCM) features, wavelets features, useful longitudinal features, mode and acquisition processes used to create the dataset, as well as digital imaging and communication in medicine (DICOM) tags (or any desirable meta-data elements) and clinical data (i.e., patient age, structural data, case data, patient history, etc.). Train-test split generation program 150 may automatically extract low-level features for each dataset it receives, including labels or ground truths for each of the received datasets. High-level features broadly include any features that may be built on top of low-level features to engage in more semantic classifications, recognitions, or predictions. In multimodal medical imaging domains, high-level features may be more semantic and tend to mimic human perception of similarity in images. To extract high-level features, train-test split generation program 150 may extract a deep layer in a pre-trained deep neural network (DNN) and utilize the DNN to generate inferences for each of the received datasets. If the pretrained model includes an encoder/decoder architecture, the encoder layer may be taken. Otherwise, a pre-last layer may be taken. In other embodiments, a pretrained model trained on another type of dataset, for example, ImageNet may also be adequate.

At 204, train-test split generation program 150 may automatically determine a series of impactful features for each of the received datasets correlating to a corresponding label. For a given dataset, train-test split generation program 150 may perform univariate analysis using statistical tests to determine the most important (impactful) features correlated to a label corresponding to the given dataset. Train-test split generation program 150 may utilize Kolmogorov-Smirnov tests for continuous features, chi-squared tests for categorical features, or other statistical tests as may be useful for determining which features are most important in making determinations or predictions for a corresponding label. Returning to the above-discussed example of multimodal medical imaging data, for a given received dataset, train-test split generation program 150 may use statistical tests to determine which of the extracted clinical features, radiomics features, clinical data, or DICOM tags, are most prioritized or correlated to the label by the target machine learning model when making a prediction or determination. In other words, for a given received dataset, train-test split generation program 150 determines a series of impactful features correlated to the label corresponding to the received dataset to identify which features (high-level and low level) are most important in arriving at an accurate prediction or determination based on the label. Train-test split generation program 150 may organize each of the determined impactful features by p-value. For example, for an exemplary received dataset D1, train-test split generation program 150 may utilize univariate analysis to determine a list of impactful features 'F' including 'tumor shape', 'tumor size', 'tumor intensity', 'tumor thickness', 'tumor type', etc. that are correlated to known labels associated with D1. Train-test split generation program 150 may then utilize, for example, Kolmogorov-Smirnov test for continuous features, and chi-squared test for categorical features, to generate a list of the impactful features F that is sorted by p-value.

At 206, train-test split generation program 150 may automatically select a subset of impactful features. As will be described in greater detail below, this step is the first step in an iterative loop that train-test split generation program 150 may repeatedly perform to generate unique train-test split versions. At this step, train-test split generation program 150 may select subsets 'f' of impactful features by iteratively choosing a unique combination of impactful features from the series of impactful features 'F' identified at 204. Returning to the example above, in which train-test split generation program 150 identified a series of impactful features 'F', at 206, train-test split generation program 150 may then select a subset (combination) 'f' of impactful features including, for example, 'tumor shape', 'tumor type' and 'tumor size'. Train-test split generation program 150 be configured to generate unique subsets 'f' from the series of impactful features 'F' using any suitable method. For example, in some embodiments, train-test split generation program 150 may be configured to utilize greedy algorithms to generate unique subsets based on p-values computed for impactful features 'F' identified at 204. In other embodiments, train-test split generation program 150 may select subsets of impactful features by considering a second set of p-values determined when train-test split generation program 150 iteratively computes low-level scores for each generated train-test split version as will be described in greater detail below in connection with step 212 (and the iterative loop generally described in steps 206-212).

Next at 208, train-test split generation program 150 may automatically cluster the received datasets to generate a series of clusters, the series of clusters corresponding to a selected subset of impactful features. Train-test split generation program 150 may utilize any suitable clustering algorithms, including but not limited to algorithms utilizing k-means, Density-Based Spatial Clustering of Applications with Noise (DBSCAN), optics, gaussian mixture model clustering, principal component analysis (PCA), spectral clustering or any other known types of clustering algorithms that may be useful for generating clusters of datasets corresponding to the selected subsets of impactful features. At this step, using the exemplary subset of impactful features discussed at step 206, train-test split generation program 150 may generate an exemplary series of clusters including twenty clusters C1, C2, C3 . . . C20 corresponding to the selected subset of impactful features including 'tumor shape', 'tumor type' and 'tumor size'.

At 210, train-test split generation program 150 may automatically generate a train-test split version using datasets from each cluster in the generated series of cluster corresponding to the selected subset of impactful features. For each train-test split version generated by train-test split generation program 150, the train set represents a union of all the selected train instances in the series of clusters, and similarly, the test set represents a union of all the selected test instances in the series of clusters. In embodiments, train-test split generation program 150 may further be configured to ensure that each generated train-test split version is split according to a predetermined train to test ratio. Returning to the above-described example, at this step, train-test split generation program 150 may be configured to generate a train-test split version for an exemplary series of clusters including clusters C1-C20 associated with a selected subset of impactful features 'f' (taken from the series of impactful features 'F'") including 'tumor shape', 'tumor type' and 'tumor size'. Train-test split generation program will generate the train test split version by generating a train set representing a union of all the selected train instances in each of the clusters C1, C2, C3 . . . C20, and a test set representing a union of all the selected test instances in each of the cluster C1, C2, C3 . . . C20. Train-test split generation program 150 will also ensure that the generated split version corresponds to a predetermined train to test ratio, for example, 80 train to 20 test datasets (80:20 split). Train-test split generation program 150 may apply the predetermined train to test ratio to each individual cluster in the series of clusters corresponding to a selected subset of impactful features for each unique split version created. In embodiments, train-test split generation program 150 may automatically balance the 80:20 train-test split to include datasets corresponding to different labels (different predictions or classifications) to ensure the train portion includes an optimal variety of predictions and outcomes.

At 212, train-test split generation program 150 may automatically score the generated train-test split version. At this step, train-test split generation program 150 may first begin by calculating a low-level score (LLS) and a high-level score (sometimes referred to as FID, or FID measurements).

In embodiments, returning to the example above, train-test split generation program 150 may calculate the low-level score for each impactful feature in the series of impactful features 'F' by applying a statistical test to get a second set of p-values of train-test distributions for that feature. The low-level score may be the lowest p-values from the second set of p-values over all features which represents the worst non-balanced feature.

Train-test split generation program 150 may then compute a high-level score by utilizing Frechet Inception Distance (FID) metric measurements to measure the distance between two image distributions by a layer in a convolutional neural network (CNN). Train-test split generation program 150 may then calculate the FID for the train-test distributions using a corresponding selected layer from step 202.

Train-test split generation program 150 may then calculate a score for a given split version by letting the score of the train-test split version be a function of LLS and FID. For example, train-test split generation program 150 may calculate, for example, 'weighted_average (1-noramlizedFID, LLS). The normalizedFID value can be obtained, for example, by considering all the FIDs received in all iterations and calibrating them to [0,1] range. In embodiments, train-test split generation program 150 may store data associated with the scores for the split version.

Step 212 is the last step of a repeatable loop performed by train-test split generation program 150 to generate multiple train-test split versions. Thus, after scoring a generated train-test split version, train-test split generation program 150 will thus loop backwards in process 200 to repeatedly perform steps 206, 208, 210, and 212 to generate unique train-test split versions corresponding to different selected subsets of impactful features.

At 214, train-test split generation program 150 may automatically select a highest-scoring train-test split version based upon the scores calculated at 212 for each of the generated train-test split versions. The highest-scoring train-test split version selected may subsequently be applied to a given target machine learning model to evaluate performance.

In an alternative embodiment, train-test split generation program 150 may be configured for use with an environment in which there are fixed test sets, and the train datasets need to be split into folds. Accordingly, in these alternative embodiments, train-test split generation program 150 may be configured to split the train datasets into almost equally sized folds in which each fold has similar feature distributions to the test sets with respect to associated labels. In these embodiments, train-test split generation program 150 may be configured to perform a version of the above-described process 200 having a modified version of clustering step 208. In this alternative embodiment, to accomplish the modified clustering step, train-test split generation program 150 may first perform a clustering algorithm on a subset of impactful features 'f' in the given test set. Then train-test split generation program 150 may associate each sample in the fixed train set with the cluster having its centroid a minimal distance from the subset of impactful features 'f'.

It will be appreciated that train-test split generation program 150 thus provides improved methods for generating balanced train-test splits for machine learning analysis. Described embodiments provide a method of generating train-test splits that are balanced in view of both the extracted labels and the features considered most by a given machine learning model, thereby improving the effectiveness of train-test split evaluations even in environments in which there is multimodal data having high dimensionality, or environments having an insufficient number of available datasets, i.e. environments in which splitting by label would be unlikely to also impose a balanced split by the important features. By identifying impactful features and generating unique train-test split versions corresponding to series of clusters associated with subsets of impactful features, train-test split generation program 150 is able to score each train-test split version to identify an optimal train-test split to select, even in environments including relatively low number of available datasets having high dimensionality (as may be seen in the multimodal medical imaging dataset examples explored above). The method of this embodiment may be generalized to apply to additional modalities beyond clinical data and medical imaging data, and may also be utilized for multi-class classification, regression tasks, and unsupervised learning.

Train-test split generation program 150 is useful for generating balanced train-test splits for use with a variety of target machine learning models. In the context of this disclosure, machine learning broadly describes a function of a system that learns from data.

Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule.

It may be appreciated that FIG. 2 provides only an illustration of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of generating balanced train-test splits for machine learning analysis, the method comprising:
    automatically extracting low-level features and high-level features from a series of received datasets;
    automatically determining a series of impactful features for each of the received datasets correlating to a corresponding label;
    selecting subsets of impactful features;
    automatically clustering the received datasets to generate series of clusters, each of the generated series of clusters corresponding to one of the selected subsets of impactful features;
    automatically generating train-test split versions using datasets from each cluster in each of the generated series of clusters;
    automatically scoring the generated train-test split versions; and
    automatically selecting a highest-scoring train-test split version.

2. The computer-based method of claim 1, wherein the received datasets comprise multimodal medical imaging datasets.

3. The computer-based method of claim 2, wherein automatically extracting the low-level features and the high-level features from the series of received datasets further comprises:
    extracting one or more of: longitudinal features, Gabor features, Local Binary Pattern (LBP) features, Gray Level Co-occurrence Matrix (GLCM) features, wavelets features, radiomics features, mode and acquisition features, digital imaging and communication in medicine (DICOM) tags, and clinical data.

4. The computer-based method of claim 2, automatically extracting the low-level features and the high-level features from the series of received datasets further comprises:
    automatically extracting a deep layer in a pre-trained deep neural network (DNN) and utilizing the DNN to generate inferences for each of the received datasets.

5. The computer-based method of claim 2, wherein automatically determining the series of impactful features for each of the received datasets correlating to the corresponding label further comprises:
    automatically performing univariate analysis using statistical tests for each of the extracted low-level and high-level features to determine the series of impactful features; and
    automatically sorting the determined series of impactful features by p-value.

6. The computer-based method of claim 2, wherein the score generated for each of the generated train-test split versions is a function of a low-level score comprising a lowest p-value over a series of features, and a normalized high-level score comprising a Frechet Inception Distance (FID) measurement of a distance between two image distributions by a layer in a convolutional neural network.

7. The computer-based method of claim 2, wherein the clustering algorithm clusters the received datasets using clustering techniques selected from: k-means, Density-Based Spatial Clustering of Applications with Noise (DBSCAN), optics, gaussian mixture models, principal component analysis, and spectral clustering techniques.

8. A computer system, the computer system comprising:
    one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
    automatically extracting low-level features and high-level features from a series of received datasets;
    automatically determining a series of impactful features for each of the received datasets correlating to a corresponding label;

selecting subsets of impactful features;
automatically clustering the received datasets to generate series of clusters, each of the generated series of clusters corresponding to one of the selected subsets of impactful features;
automatically generating train-test split versions using datasets from each cluster in each of the generated series of clusters;
automatically scoring the generated train-test split versions; and
automatically selecting a highest-scoring train-test split version.

9. The computer system of claim 8, wherein the received datasets comprise multimodal medical imaging datasets.

10. The computer system of claim 9, wherein automatically extracting the low-level features and the high-level features from the series of received datasets further comprises:
extracting one or more of: longitudinal features, Gabor features, Local Binary Pattern (LBP) features, Gray Level Co-occurrence Matrix (GLCM) features, wavelets features, radiomics features, mode and acquisition features, digital imaging and communication in medicine (DICOM) tags, and clinical data.

11. The computer system of claim 9, automatically extracting the low-level features and the high-level features from the series of received datasets further comprises:
automatically extracting a deep layer in a pre-trained deep neural network (DNN) and utilizing the DNN to generate inferences for each of the received datasets.

12. The computer system of claim 9, wherein automatically determining the series of impactful features for each of the received datasets correlating to the corresponding label further comprises:
automatically performing univariate analysis using statistical tests for each of the extracted low-level and high-level features to determine the series of impactful features; and
automatically sorting the determined series of impactful features by p-value.

13. The computer system of claim 9, wherein the score generated for each of the generated train-test split versions is a function of a low-level score comprising a lowest p-value over a series of features, and a normalized high-level score comprising a Frechet Inception Distance (FID) measurement of a distance between two image distributions by a layer in a convolutional neural network.

14. The computer system of claim 9, wherein the clustering algorithm clusters the received datasets using clustering techniques selected from: k-means, Density-Based Spatial Clustering of Applications with Noise (DBSCAN), optics, gaussian mixture models, principal component analysis, and spectral clustering techniques.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
automatically extracting low-level features and high-level features from a series of received datasets;
automatically determining a series of impactful features for each of the received datasets correlating to a corresponding label;
selecting subsets of impactful features;
automatically clustering the received datasets to generate series of clusters, each of the generated series of clusters corresponding to one of the selected subsets of impactful features;
automatically generating train-test split versions using datasets from each cluster in each of the generated series of clusters;
automatically scoring the generated train-test split versions; and
automatically selecting a highest-scoring train-test split version.

16. The computer program product of claim 15, wherein the received datasets comprise multimodal medical imaging datasets.

17. The computer program product of claim 16, wherein automatically extracting the low-level features and the high-level features from the series of received datasets further comprises:
extracting one or more of: longitudinal features, Gabor features, Local Binary Pattern (LBP) features, Gray Level Co-occurrence Matrix (GLCM) features, wavelets features, radiomics features, mode and acquisition features, digital imaging and communication in medicine (DICOM) tags, and clinical data.

18. The computer program product of claim 16, automatically extracting the low-level features and the high-level features from the series of received datasets further comprises:
automatically extracting a deep layer in a pre-trained deep neural network (DNN) and utilizing the DNN to generate inferences for each of the received datasets.

19. The computer program product of claim 16, wherein automatically determining the series of impactful features for each of the received datasets correlating to the corresponding label further comprises:
automatically performing univariate analysis using statistical tests for each of the extracted low-level and high-level features to determine the series of impactful features; and
automatically sorting the determined series of impactful features by p-value.

20. The computer program product of claim 16, wherein the score generated for each of the generated train-test split versions is a function of a low-level score comprising a lowest p-value over a series of features, and a normalized high-level score comprising a Frechet Inception Distance (FID) measurement of a distance between two image distributions by a layer in a convolutional neural network.

* * * * *